United States Patent
Sun

(10) Patent No.: US 9,641,324 B2
(45) Date of Patent: May 2, 2017

(54) METHOD AND DEVICE FOR AUTHENTICATING REQUEST MESSAGE

(75) Inventor: Chao Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1506 days.

(21) Appl. No.: 12/780,170

(22) Filed: May 14, 2010

(65) Prior Publication Data

US 2010/0223468 A1 Sep. 2, 2010

Related U.S. Application Data

(63) Continuation of application No. PCT/CN2008/071894, filed on Aug. 6, 2008.

(30) Foreign Application Priority Data

Nov. 14, 2007 (CN) .......................... 2007 1 0165986

(51) Int. Cl.
*H04L 9/32* (2006.01)
*H04L 9/08* (2006.01)
(Continued)

(52) U.S. Cl.
CPC ............ *H04L 9/083* (2013.01); *H04L 9/3213* (2013.01); *H04L 63/062* (2013.01); *H04L 63/08* (2013.01);
(Continued)

(58) Field of Classification Search
CPC ...... H04W 12/06; G06F 21/31; H04L 9/0891; H04L 63/062; H04L 63/068; H04L 63/08;
(Continued)

(56) References Cited

U.S. PATENT DOCUMENTS 6,226,750 B1 * 5/2001 Trieger ................... H04L 29/06
380/264
6,263,445 B1 * 7/2001 Blumenau ............... G06F 21/31
380/282

(Continued)

FOREIGN PATENT DOCUMENTS

CN 001200535 A 12/1998
CN 1614903 A 5/2005

(Continued)

OTHER PUBLICATIONS

Written Opinion of the International Searching Authority dated Nov. 20, 2008 in connection with International Patent Application No. PCT/CN2008/071894.

(Continued)

*Primary Examiner* — Linglan Edwards

(57) ABSTRACT

A method for authenticating request messages is disclosed. An authentication service device performs centralized allocation and management for authentication random numbers; when a User Equipment (UE) uses a protected service, the key negotiation process needs to be performed only once, whereupon the authentication is performed with multiple Application Servers (ASs) in turn according to the policy of using an authentication random number. Further, the corresponding authentication service device, AS, and UE are disclosed.

14 Claims, 8 Drawing Sheets

(51) Int. Cl.
*H04L 29/06* (2006.01)
*H04L 29/08* (2006.01)

(52) U.S. Cl.
CPC ........ *H04L 63/0823* (2013.01); *H04L 63/168* (2013.01); *H04L 67/02* (2013.01)

(58) Field of Classification Search
CPC ... H04L 63/0823; H04L 63/168; H04L 9/083; H04L 9/0833; H04L 9/0861; H04L 9/0869; H04L 9/3213; H04L 67/02; H04L 67/14; H04L 67/146
USPC .......................................................... 380/259
See application file for complete search history.

(56) References Cited

U.S. PATENT DOCUMENTS

| | | | | |
|---|---|---|---|---|
| 7,313,381 | B1* | 12/2007 | Lemilainen | G06Q 20/027 380/30 |
| 7,558,957 | B2* | 7/2009 | Patel | H04L 9/0844 713/169 |
| 7,835,528 | B2* | 11/2010 | Bajko | H04L 63/067 380/277 |
| 2001/0037469 | A1* | 11/2001 | Gupta | G06F 21/33 726/2 |
| 2002/0073322 | A1* | 6/2002 | Park | H04L 9/3271 713/188 |
| 2002/0094081 | A1* | 7/2002 | Medvinsky | 380/44 |
| 2003/0063750 | A1* | 4/2003 | Medvinsky et al. | 380/277 |
| 2003/0069967 | A1* | 4/2003 | Vincent | G06F 21/6218 709/225 |
| 2005/0044377 | A1* | 2/2005 | Huang | 713/182 |
| 2005/0144484 | A1* | 6/2005 | Wakayama | G06F 21/36 726/19 |
| 2005/0210253 | A1* | 9/2005 | Shigeeda | H04L 9/0863 713/171 |
| 2005/0240520 | A1 | 10/2005 | Stura et al. | |
| 2005/0265349 | A1* | 12/2005 | Garg | H04L 29/06027 370/395.2 |
| 2005/0268096 | A1* | 12/2005 | Kilian-Kehr et al. | 713/168 |
| 2005/0287990 | A1* | 12/2005 | Mononen et al. | |
| 2006/0053288 | A1* | 3/2006 | Stern | H04L 9/0844 713/168 |
| 2006/0143453 | A1* | 6/2006 | Imamoto et al. | 713/169 |
| 2006/0196931 | A1* | 9/2006 | Holtmanns | G06Q 20/3552 235/380 |
| 2006/0253424 | A1 | 11/2006 | Huang | |
| 2008/0130852 | A1 | 6/2008 | Li | |

FOREIGN PATENT DOCUMENTS

| | | |
|---|---|---|
| CN | 1756428 A | 4/2006 |
| CN | 1801697 A | 7/2006 |
| CN | 1845600 A | 10/2006 |
| CN | 1968106 A | 5/2007 |
| CN | 1977514 A | 6/2007 |
| CN | 101043328 A | 9/2007 |
| CN | 101163010 A | 4/2008 |
| EP | 1 526 677 A1 | 4/2005 |
| EP | 1 601 154 A1 | 11/2005 |
| WO | WO 2006/072209 A1 | 7/2006 |
| WO | WO 2006/085170 A1 | 8/2006 |
| WO | WO 2007/008120 A1 | 1/2007 |
| WO | WO 2007/016849 A1 | 2/2007 |
| WO | WO 2007/026914 | 3/2007 |
| WO | WO 2007/034322 A1 | 3/2007 |

OTHER PUBLICATIONS

Supplementary European Search Report dated Dec. 20, 2011 in connection with European Patent Application No. EP 08 78 3887.
Office Action dated Aug. 14, 2009 in connection with Chinese Patent Application No. 200710165986.8.
Office Action dated May 11, 2010 in connection with Chinese Patent Application No. 200710165986.8.
International Search Report issued Nov. 20, 2008 in connection with International Patent Application No. PCT/CN2008/071894.
Invitation pursuant to Article 94(3) and Rule 71(1) EPC dated Apr. 4, 2013 in connection with European Patent Application No. EP 08 783 887.6.

* cited by examiner

--PRIOR ART--

METHOD AND DEVICE FOR AUTHENTICATING REQUEST MESSAGE

CROSS-REFERENCE TO RELATED APPLICATIONS

This application is a continuation of International Application No. PCT/CN2008/071894, filed on Aug. 6, 2008, which claims priority to Chinese Patent Application No. 200710165986.8, filed on Nov. 14, 2007, both of which are hereby incorporated by reference in their entireties.

TECHNICAL FIELD

The present invention relates to communication technologies, and in particular, to a method for an authentication service device to authenticate request messages, a method for an Application Server (AS) to authenticate requests of a User Equipment (UE), a UE authentication method, and the corresponding authentication service device, AS, and UE.

BACKGROUND

With the diversification and development of communication services, both the service provider and the user require a reliable security mechanism to ensure legal use of services. For example, in the Internet Protocol Multimedia Subsystem (IMS)-based Multimedia Broadcast and Multicast Service (MBMS), the User Equipment (UE) is generally authenticated before the user accesses a protected MBMS service through the UE. FIG. 1 shows a common authentication process in the prior art. The authentication process includes two steps:

I. Key Negotiation

Through the key negotiation process, the UE and an authentication service device that provides a security mechanism negotiate the shared key-related data. Specifically, the key negotiation is generally performed through a Generic Bootstrapping Architecture (GBA). In the GBA, the device that provides the security mechanism is a Bootstrapping Server Function (BSF). After completion of the GBA process, both the UE and the BSF have recorded the key-related data of the GBA process, including Bootstrapping Transaction Identifier (B-TID), IP Multimedia Private Identity (IMPI), Cipher Key (CK), and Integrity Key (IK). The UE and the BSF may use the CK and the IK to generate keys (Ks) shared between them.

II. Security Association

The security association process associates the Ks negotiated between the UE and the BSF to the AS which provides the Network Application Function (NAF). After completion of the GBA process, the Ks is shared between the UE and the BSF, and the UE may use the AS identifier (NAF_Id) and the Ks to calculate the relevant keys (Ks_NAF). However, the KS has not obtained the key information yet. To negotiate the keys shared between the UE and the AS, the following steps need to be performed:

1. The UE sends a HyperText Transfer Protocol (HTTP) request to the AS, and the request carries a B-TID.

2. The AS sends an HTTP request to the BSF, and the request carries the B-TID and the host name of the AS.

3. After the BSF authenticates the request of the AS, the BSF calculates out the relevant keys (Ks_NAF) according to the Ks negotiated with the UE and the received host name. Afterward, the BSF sends an HTTP response to the AS. The response may carry the validity period of the keys and the security settings of the user.

4. After receiving the response from the BSF, the AS calculates the authentication response data according to the Ks_NAF, and sends the data to the UE through an HTTP response.

After the UE authenticates the response from the AS according to the recorded Ks_NAF, the authentication process is finished, and the UE and the AS may start secure communications through the established shared keys (Ks_NAF).

During the research and practice of the present invention, the inventor finds that to complete a sophisticated service, multiple service functions need to work together at the server side; namely, multiple as is needed to implement a complete service. For example, for the MBMS service on a mobile network, an AS1 which provides a demonstration portal enables the UE to obtain the service guide, and an AS2 which provides a subscription portal enables the user to subscribe to the MBMS service. In this case, according to the current authentication mode, the UE needs to perform the foregoing key negotiation process and security association process with different ASs. Too many message interactions are involved, and the application response speed is delayed.

SUMMARY

Embodiments of the present invention provide a request message authentication solution to simplify the authentication process between a UE and multiple applications.

A request message authentication method includes: negotiating key information with a UE, and allocating an authentication transaction identifier and an authentication random number corresponding to the key information to the UE; receiving an association request from an AS, where the association request carries the authentication transaction identifier and the authentication random number; verifying the authentication random number carried in the association request according to the authentication transaction identifier carried in the association request; and searching for the key information corresponding to the authentication transaction identifier carried in the association request after the verification succeeds, and returning an association response to the AS in response to the association request, where the association response carries an authentication key generated according to the found key information.

A method for an AS to authenticate a request of a UE includes: receiving an authentication request from a UE, where the authentication request carries an authentication transaction identifier and an authentication random number; sending an association request to an authentication service device according to the authentication request, where the association request carries the authentication transaction identifier and the authentication random number; receiving an association response returned by the authentication service device in response to the association request, where the association response carries an authentication key; and returning a success response to the UE in response to the authentication request, where the success response carries the authentication response data generated according to the authentication key.

A UE authentication method includes: sending an authentication request to an AS, where the authentication request carries an authentication transaction identifier and an authentication random number corresponding to key information; receiving a success response returned by the AS in response to the authentication request, where the success response carries authentication response data; and verifying the authentication response data according to the key information.

An authentication service device includes: an authentication service module, adapted to: negotiate key information with a UE, and allocate an authentication transaction identifier and an authentication random number corresponding to the key information to the UE; and a uniform authentication module, adapted to: receive an association request from an AS, and obtain the authentication transaction identifier and the authentication random number carried in the association request; verify the authentication random number carried in the association request according to the authentication transaction identifier carried in the association request and the data provided by the authentication service module; and search for the key information corresponding to the authentication transaction identifier carried in the association request after the verification succeeds, and return an association response to the AS in response to the association request, where the association response carries an authentication key generated according to the found key information.

An AS includes: an interface module, adapted to: receive an authentication request from a UE; send an association request to an authentication service device; receive an association response returned by the authentication service device in response to the association request; and return a success response to the UE in response to the authentication request; and a security association module, adapted to: obtain an authentication transaction identifier and an authentication random number carried in the authentication request, and generate the association request according to the authentication request, where the association request needs to be sent to the authentication service device and carries the authentication transaction identifier and the authentication random number; obtain an authentication key carried in the association response, generate authentication response data according to the authentication key carried in the association response, and generate the success response that needs to be returned to the UE, where the success response carries the authentication response data.

A UE includes: a security service module, adapted to: negotiate key information with an authentication service device, and obtain an authentication transaction identifier and an authentication random number which are allocated by the authentication service device and correspond to the key information; an application service module, adapted to: send an authentication request to an AS, where the authentication request carries the authentication transaction identifier and the authentication random number; and obtain a success response returned by the AS in response to the authentication request, obtain the authentication response data carried in the success response, and verify the authentication response data according to the key information; and an authentication control module, adapted to: judge whether the key information and the authentication transaction identifier and the authentication random number corresponding to the key information are stored when an authentication request needs to be sent to the AS; if no such information is stored, control the security service module to obtain the required data; and if such information is stored, control the application service module to send an authentication request.

In the technical solution under the present invention, the authentication service device performs centralized allocation and management for the authentication random numbers. When the UE uses a protected service, the key negotiation process needs to be performed only once, whereupon the authentication is performed with multiple ASs in turn according to the policy of using an authentication random number. Therefore, the process of authentication between the UE and the application is simplified, and the application response speed is improved.

DETAILED DESCRIPTION

A request message authentication solution is provided in an embodiment of the present invention. The solution is detailed below in different point of view with respect to an authentication service device, an AS, and a UE.

Figure 1:
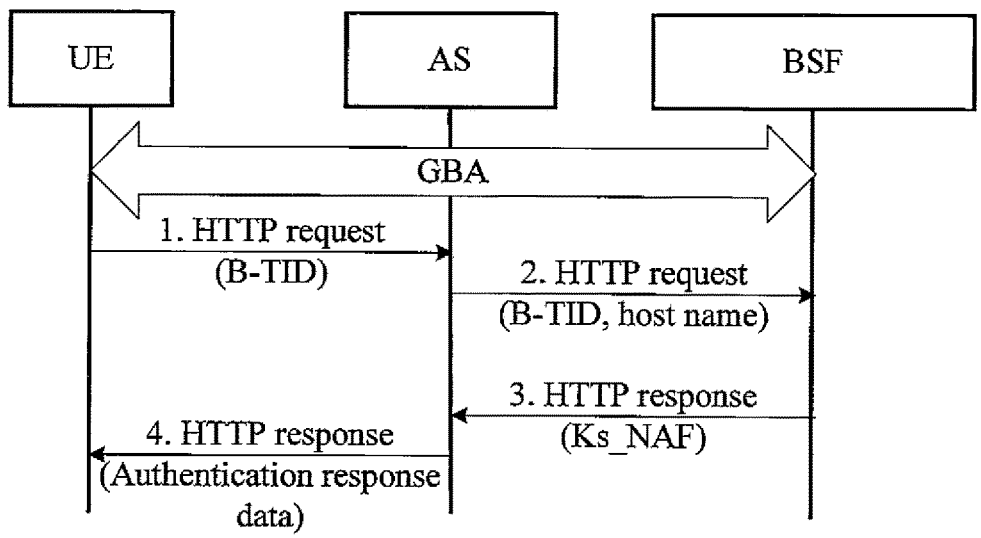
FIG. 1 is a flowchart of an authentication method in the prior art.
Figure 2:
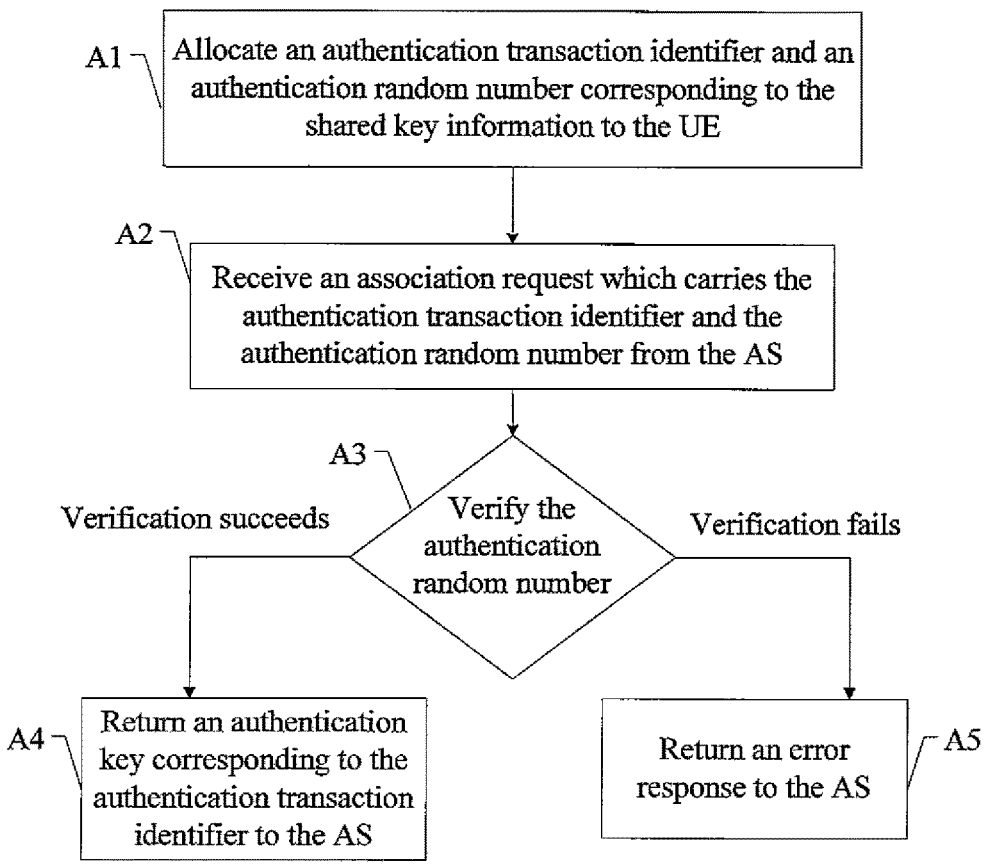
FIG. 2 is a flowchart of an authentication method used by an authentication service device to authenticate a request message in an embodiment of the present invention.

FIG. 2 is a flowchart of an authentication method used by an authentication service device to authenticate a request message in an embodiment of the present invention. The authentication method includes the following steps:

A1. An authentication service device negotiates key information with a UE, and allocates an authentication transaction identifier and an authentication random number corresponding to the key information to the UE.

This embodiment does not limit the mode of negotiation of key between the authentication service device and the UE. Any key negotiation mode is appropriate only if it enables both parties to obtain shared key information through the negotiation. The negotiation mode in use needs to be extended so that the authentication random number allocated by the authentication service device can be delivered to the UE.

For example, if the key negotiation is done through a GBA process. The Ks may be regarded as shared key information, and the B-TID allocated in the GBA process may be used as an authentication transaction identifier. The authentication random number may be carried in a new parameter (such as nextnonce) which is obtained by extending the response message to the UE.

The authentication service device may manage the authentication random number in two management modes:

(1) Update Management

The authentication service device may allocate a new authentication random number to UE in response to each subsequent authentication request of the UE. For example, after completion of the key negotiation, the authentication service device sends a success response through which the first authentication random number is allocated to the UE. The first authentication random number is used when the UE sends an authentication request to the AS for the first time. Subsequently, whenever responding to the association request of the AS successfully, the authentication service device returns a newly allocated authentication random number which is delivered to the UE through the AS and is used in the next authentication request of the UE.

(2) Use Count Management

The authentication service device may record the use count of the allocated authentication random number. For example, after completion of the key negotiation, the authentication service device sends a success response through which the first authentication random number is allocated to the UE, and the use count of the authentication random number is initialized to 1; subsequently, whenever responding to the association request of the AS successfully, the authentication service device increases the use count of the authentication random number progressively. In this mode, the UE also needs to record the use count of the authentication random number and increase the use count accordingly. The authentication request sent to the AS carries the use count of the authentication random number. The use count is further carried in the association request of the AS to the authentication service device, and is used as a basis for the authentication service device to verify the request message.

A2. The authentication service device receives the association request from the AS, where the association request carries the authentication transaction identifier and the authentication random number.

If the management mode (2) is applied, the association request received by the authentication service device further carries the use count of the authentication random number.

A3. The authentication service device verifies the authentication random number carried in the association request according to the authentication transaction identifier carried in the received association request. If the verification succeeds, the process proceeds to step A4; and, if the verification fails, the process goes to step A5.

Based on the management mode (1), the authentication service device verifies the authentication random number by: searching for the authentication random number corresponding to the authentication transaction identifier carried in the association request, and verifying whether the authentication random number carried in the association request is consistent with the found authentication random number.

Based on the management mode (2), the authentication service device verifies the authentication random number by: searching for the authentication random number and the use count of the authentication random number corresponding to the authentication transaction identifier carried in the association request, and verifying whether the authentication random number and its use count carried in the association request are consistent with those found authentication random number and its use count.

A4. After the verification succeeds, the authentication service device searches for the key information corresponding to the authentication transaction identifier carried in the association request, and returns an association response to the AS in response to the association request, where the association response carries an authentication key generated according to the found key information.

For example, if the MBMS Request Key (MRK) is negotiated through a GBA process, the authentication service device may search for the corresponding Ks according to the B-TID carried in the association request, calculate the MRK according to the Ks, and return the MRK to the AS as an authentication key.

Based on the management mode (1), after the verification succeeds, the authentication service device needs to allocate a new authentication random number to update the found authentication random number. The returned association response carries the new authentication random number.

Based on the management mode (2), after the verification succeeds, the authentication service device needs to increase the use count of the found authentication random number progressively.

A5. After the verification fails, the authentication service device returns an error response to the AS in response to the association request.

The verification fails if the information to be verified is inconsistent with the found information (for example, if the authentication random number is inconsistent with the stored authentication random number, or if the use count of the authentication random number is inconsistent with the stored use count), or if the relevant information is not retrievable according to the authentication transaction identifier.

After the verification fails, the authentication service device may return an association failure response indicative of verification failure, and, through the AS, instruct the UE to perform the key negotiation process again. To further shorten the process, the authentication service device may deal with different failure circumstances accordingly, and return different error responses corresponding to different circumstances. For example, the authentication service device may further check for existence of any key information corresponding to the authentication transaction identifier carried in the association request. If such key information exists, it indicates that the key information shared with the UE still exists. The authentication service device may further check the validity of the key information. Therefore, the authentication service device may reallocate an authentication random number and use it as an authentication random number corresponding to the authentication transaction identifier carried in the association request, and return an association reset response to the AS in response to the association request. The association reset response carries the reallocated authentication random number, and may further carry an error cause. In this way, the UE may use the reallocated authentication random number to resend an authentication request to the AS. If no key information corresponding to the authentication transaction identifier carried in the association request exists, the authentication service device returns an association failure response to the AS and requires the UE to perform the key negotiation process again. The association failure response corresponds to the association request and indicates verification failure, and may further carry a cause of error.

The foregoing detailed error response mode is applicable to both the management mode (1) and the management mode (2). In the management mode (2), the authentication service device and the UE need to not only update the stored authentication random number, but also initialize the use count of the authentication random number.

Figure 3:
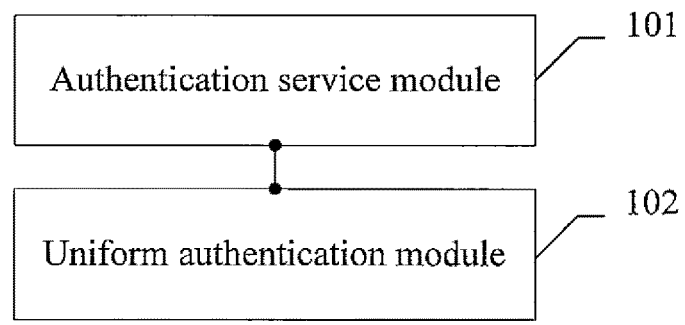
FIG. 3 shows a logical structure of an authentication service device in an embodiment of the present invention.

Given below is an embodiment of the authentication service device which executes the foregoing method for authenticating request messages. To minimize the change to the existing device, the authentication service device in this embodiment inherits the existing modules of authentication service functions and adds a uniform authentication module which provides extended functions. As shown in FIG. 3, the authentication service device in this embodiment includes: an authentication service module 101 and a uniform authentication module 102.

The authentication service module 101 is adapted to: negotiate key information with a UE, and allocate an authentication transaction identifier and an authentication random number corresponding to the key information to the UE. This module performs the general authentication service functions, and the extended function is to deliver the authentication random number to the UE.

The uniform authentication module 102 is adapted to: receive an association request from an AS, and obtain the authentication transaction identifier and the authentication random number carried in the association request; verify the authentication random number carried in the association request according to the authentication transaction identifier carried in the association request and the data provided by the authentication service module 101; and search for the key information corresponding to the authentication transaction identifier carried in the association request after the verification succeeds, and return an association response to the AS in response to the association request, where the association response carries an authentication key generated according to the found key information.

To reduce the load of information query between modules, the uniform authentication module 102 is further adapted to store the data found in the authentication service module 101 for verifying the authentication random number carried in the association request. In this way, when the uniform authentication module 102 verifies the authentication random number carried in the association request, the uniform authentication module 102 may query the stored data first, and, if the query fails, query the authentication service module 101. After receiving a query request from the uniform authentication module 102, the authentication service module 101 may return a response which carries the corresponding authentication random number, key information etc altogether. In this way, the uniform authentication module 102 may search the stored data for the key information directly after the verification succeeds.

Based on different modes of managing the authentication random number, the uniform authentication module 102 verifies the authentication random number carried in the association request by: verifying whether the authentication random number carried in the association request is consistent with the stored authentication random number, or verifying whether the authentication random number carried in the association request and its use count are consistent with the stored authentication random number and its use count (in the latter case, the uniform authentication module 102 further obtains the use count of the authentication random number carried in the association request). In the former case, the uniform authentication module 102 is further adapted to: allocate a new authentication random number to update the stored authentication random number after the verification succeeds, and add the new authentication random number into a returned association response for instructing the UE to use the new authentication random number to send an authentication request to the next AS. In the latter case, the uniform authentication module 102 is further adapted to increase the stored use count of the authentication random number progressively after the verification succeeds.

To deal with the process of verification failure, the uniform authentication module 102 is further adapted to return an association failure response to the AS in response to the received association request. The association failure response indicates that the verification fails and the UE needs to perform key negotiation again. The uniform authentication module 102 may be further adapted to execute the foregoing detailed error response solution. That is, after the verification fails, the uniform authentication module 102 checks for existence of any key information corresponding to the authentication transaction identifier carried in the association request. If such key information exists, the uniform authentication module 102 reallocates an authentication random number to update the stored authentication random number corresponding to the authentication transaction identifier carried in the association request, and returns an association reset response to the AS in response to the association request. The association reset response carries the reallocated authentication random number for instructing the UE to use the reallocated authentication random number to resend an authentication request to the AS. If no such key information exists, with reference to the foregoing processing of verification failure, the uniform authentication module 102 returns an association failure response to the AS in response to the association request.

Figure 4:
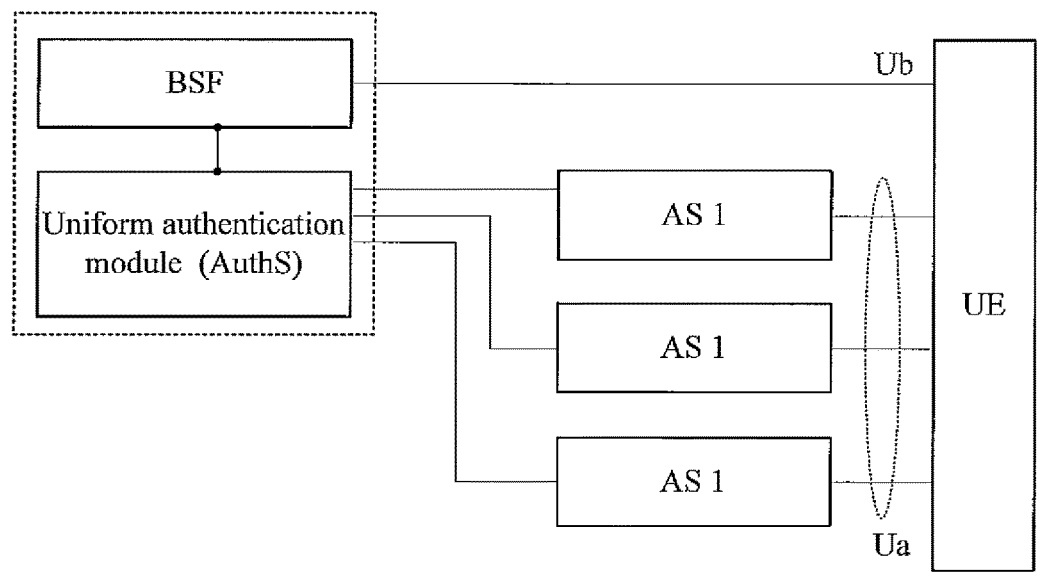
FIG. 4 shows an application system architecture of an authentication service in an embodiment of the present invention.

In a Generic Authentication Architecture (GAA), the authentication service module in this embodiment can be implemented with reference to the BSF. As a new module, the uniform authentication module, also named as the Authentication Server (AuthS) may be integrated with the BSF or implemented as an authentication server independent from the BSF. FIG. 4 shows an application system architecture of an AuthS in the case that the AuthS is integrated with the BSF. A GAA-based Ub interface exists between the BSF and the UE, and a GAA-based Ua interface exists between the UE and each AS. The format of the interface message between the AuthS and each AS is similar to the format of the message between the UE and the AS, or the XML format. The specific bearer protocol (such as HTTP and HTTPS) is not limited herein. The interface between the AuthS and the BSF is an internal interface, and is not necessarily defined. If the AuthS is independent, the interface between the AuthS and the BSF is similar to the Zn interface between the AS and the BSF in the GAA, which can be used as a reference. To make the illustration clearer, FIG. 4 does not show the connection between the AS and the BSF. To be compatible with the existing GAA authentication mode, the AS may maintain the connection with the BSF. In the service implementation process, the existing authentication mode (using the interface to the BSF) or the authentication mode provided herein (using the interface to the AuthS) is selected by judgment according to the authentication request of the UE.

Figure 5:
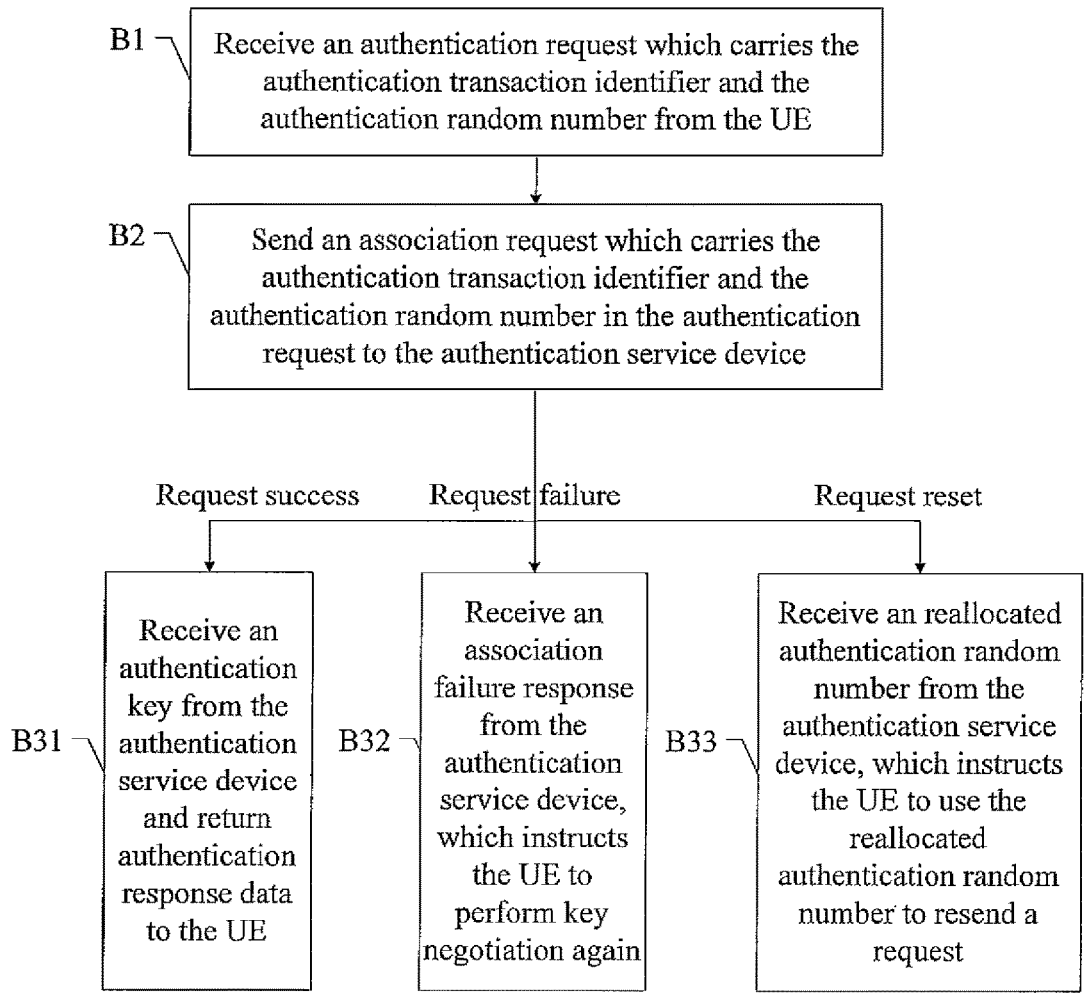
FIG. 5 is a flowchart of an authentication method used by an AS to authenticate a request of a UE in an embodiment of the present invention.

FIG. 5 shows an authentication method used by an AS to authenticate a request of a UE in an embodiment of the present invention. The authentication method in this embodiment corresponds to the authentication method used by an authentication service device to authenticate a request message in the preceding embodiment. The authentication method in this embodiment includes the following steps:

B1. The AS receives an authentication request from a UE, where the authentication request carries an authentication transaction identifier and an authentication random number.

If the management mode (2) is applied, this authentication request further carries the use count of the authentication random number.

To be compatible with the existing authentication mode, the AS may select an adaptable authentication mode first according to the specific conditions of the authentication request after receiving the authentication request from the UE. For example, in the current GAA process, the authentication request sent by the UE further carries a domain name of the server which authenticates the request. The domain name is usually placed in the last part of the realm parameter, and is delimited from the first half part by an @ symbol. After receiving the request, the AS may check whether the domain name behind the @ symbol of the realm parameter is consistent with the domain name of the AS. If they are consistent, the AS applies the existing GAA authentication process; if they are not consistent, and the domain name is the domain name of the authentication service device (for example, the domain name of the BSF), the AS executes the authentication process provided in this embodiment.

B2. The AS sends an association request to the authentication service device according to the received authentication request, where the association request carries the authentication transaction identifier and the authentication random number in the authentication request.

If the management mode (2) is applied, this association request further carries the use count of the authentication random number.

B3. The AS performs the corresponding subsequent operations according to different response results of the authentication service device, including:

B31. In the case of request success: The AS receives the association response returned by the authentication service device in response to the sent association request, where the association response carries an authentication key. The AS records the authentication key, and calculates the authentication response data according to the authentication key. Afterward, the AS returns a success response to the UE in response to the authentication request sent by the UE. The success response carries the generated authentication response data. Further, the AS may use the authentication key to authenticate the authentication request of the UE first, and return a success response to the UE after the authentication succeeds. If the management mode (1) is applied, the received association response further carries a new authentication random number. Therefore, the success response returned to the UE needs to further carry the new authentication random number for instructing the UE to use this new authentication random number to send an authentication request to the next AS.

B32. In the case of request failure: The AS receives an association failure response returned by the authentication service device in response to the sent association request, and returns a failure response to the UE in response to the authentication request sent by the UE according to the association failure response. The failure response carries an indication which requires the UE to perform key negotiation again.

B33. In the case of request resetting: The AS receives an association reset response returned by the authentication service device in response to the sent association request, where the association reset response carries the reallocated authentication random number. The AS returns a reset response to the UE in response to the authentication request sent by the UE. The reset response carries the reallocated authentication random number for instructing the UE to use this reallocated authentication random number to resend an authentication request.

Figure 6:
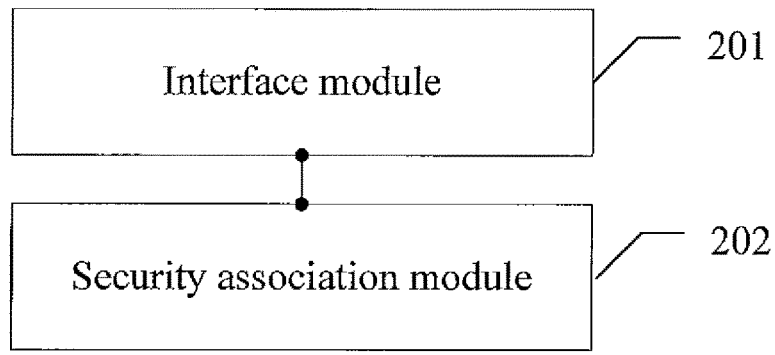
FIG. 6 shows a logical structure of an AS in an embodiment of the present invention.

Given below is an embodiment of the AS which executes the foregoing method for authenticating a request of a UE. As shown in FIG. 6, the AS includes: an interface module 201 and a security association module 202.

The interface module 201 is adapted to: receive an authentication request from a UE; send an association request to an authentication service device; receive an association response returned by the authentication service device in response to the sent association request; and return a success response to the UE in response to the authentication request sent by the UE.

If an error response is returned by the authentication service device, the interface module 201 is further adapted to: receive an association failure response or an association reset response returned by the authentication service device in response to the sent association request; and return a failure response or a reset response to the UE in response to the authentication request sent by the UE.

The security association module 202 is adapted to: obtain an authentication transaction identifier and an authentication random number carried in an authentication request which is received by the interface module 201, generate an association request which needs to be sent to the authentication service device, where the association request carries the authentication transaction identifier and the authentication random number in the authentication request; obtain an authentication key carried in an association response which is received by the interface module 201, calculate the authentication response data according to the authentication key, and generate a success response that needs to be returned to the UE, where the success response carries the authentication response data. Further, the security association module 202 may use the authentication key to authenticate the authentication request of the UE first, and generate a success response after the authentication succeeds.

If an error response is returned by the authentication service device, the security association module 202 is further adapted to: generate a failure response that needs to be returned to the UE according to the association failure response received by the interface module 201, where the failure response carries an indication which instructs the UE to perform key negotiation again; obtain the reallocated authentication random number carried in the association reset response according to the association reset response received by the interface module 201; and generate a reset response that needs to be returned to the UE, where the reset response carries the reallocated authentication random number, with a view to instructing the UE to use the reallocated authentication random number to resend an authentication request.

To be compatible with the existing authentication mode, the security association module 202 is further adapted to obtain the domain name of the server which authenticates the request, where the domain name is carried in the authentication request. In this case, the security association module 202 may be further adapted to: check that the domain name (carried in the authentication request) of the server which authenticates the authentication request is the domain name of the authentication service device, and then generate an association request that needs to be sent to the authentication service device; and perform the subsequent operations according to the existing authentication mode if determining that the domain name (carried in the authentication request) of the server which authenticates the authentication request is its own domain name.

Figure 7:
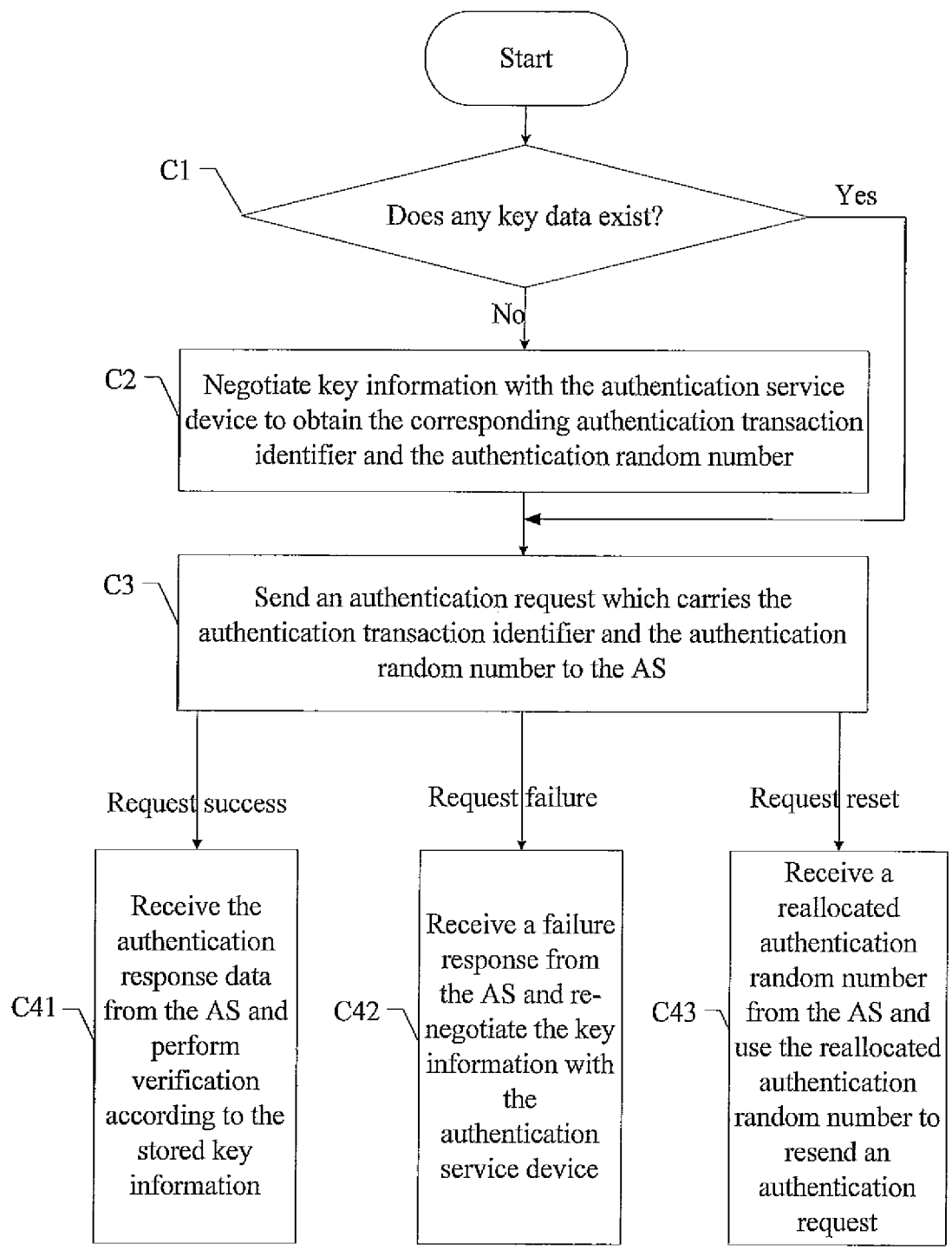
FIG. 7 is a flowchart of a UE authentication method in an embodiment of the present invention.

FIG. 7 is a flowchart of a UE authentication method in an embodiment of the present invention. The authentication method in this embodiment corresponds to the authentication method used by an authentication service device to authenticate a request message and the authentication method used by an AS to authenticate a request of a UE in the preceding embodiments. The authentication method in this embodiment includes the following steps:

C1. The UE judges whether any key information, and the authentication transaction identifier and the authentication random number corresponding to the key information are stored. If no such information is stored, the process proceeds to step C2; if such information is stored, the process goes to step C3.

C2. The UE negotiate a key information with the authentication service device, obtaining an authentication transaction identifier and an authentication random number which are allocated by the authentication service device and correspond to the key information. The process proceeds to step C3.

C3. The UE sends an authentication request to an AS, where the authentication request carries the stored authentication transaction identifier and authentication random number.

If the management mode (2) is applied, this authentication request further carries the use count of the authentication random number.

C4. The UE performs the corresponding subsequent operations according to different response results of the AS, including:

C41. In the case of request success: The UE receives a success response returned by the AS in response to the sent authentication request, where the success response carries authentication response data; and verifies the authentication response data according to the stored key information. If the management mode (1) is applied, the received success response further carries a new authentication random number, and therefore, the UE uses the new authentication random number to update the stored authentication random number; if the management mode (2) is applied, the UE increases the stored use count of the authentication random number progressively.

C42. In the case of request failure: The UE receives a failure response returned by the AS in response to the sent authentication request, where the failure response carries an indication which instructs the UE to perform key negotiation again. According to the indication, the UE clears the stored key information and the corresponding authentication transaction identifier and authentication random number, negotiate the key information with the authentication service device again, and then uses the re-negotiated key information to send an authentication request to the AS, namely, starts from step C2.

C43. In the case of request resetting: The UE receives a reset response returned by the AS in response to the sent authentication request. The reset response carries the reallocated authentication random number. The UE uses the reallocated authentication random number to update the stored authentication random number, and then uses the reallocated authentication random number to send an authentication request to the AS, namely, starts from step C3. If the management mode (2) is applied, the UE needs to initialize the use count of the authentication random number when updating the stored authentication random number.

Figure 8:
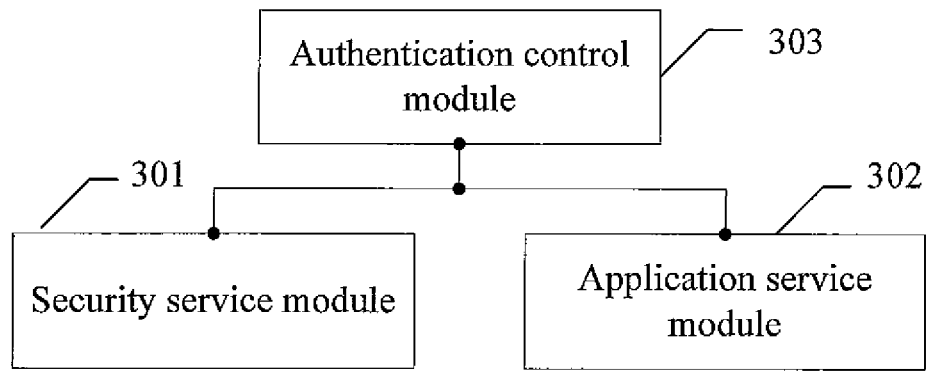
FIG. 8 shows a logical structure of a UE in an embodiment of the present invention.

Given below is an embodiment of the UE which executes the foregoing authentication method. As shown in FIG. 8, the UE includes:

a security service module 301, adapted to: negotiate key information with an authentication service device, and obtain an authentication transaction identifier and an authentication random number which are allocated by the authentication service device and correspond to the key information;

an application service module 302, adapted to: send an authentication request to the AS, where the authentication request carries the authentication transaction identifier and the authentication random number obtained by the security service module 301; and obtain a success response returned by the AS in response to the sent authentication request, obtain the authentication response data carried in the success response, and verify the authentication response data according to the key information obtained by the security service module 301; and an authentication control module 303, adapted to: judge whether the key information and the authentication transaction identifier and the authentication random number corresponding to the key information are stored when an authentication request needs to be sent to the AS; if no such information is stored, control the security service module 301 to obtain the required data; and, if such information is stored, control the application service module 302 to send an authentication request.

Further, if the management mode (1) is applied, the application service module 302 is further adapted to obtain a new authentication random number from the success response. In this case, the authentication control module 303 is further adapted to use the new authentication random number to update the stored authentication random number.

Further, if the management mode (2) is applied, the application service module 302 is further adapted to add the use count of the authentication random number into the authentication request. In this case, the authentication control module 303 is further adapted to increase the stored use count of the authentication random number progressively after the application service module 302 obtains the success response.

In the case of request failure, the application service module 302 is further adapted to: obtain a failure response or a reset response returned by the AS in response to the sent authentication request, obtain the indication in the failure response which instructs the UE to perform key negotiation again, and obtain the reallocated authentication random number in the reset response. The authentication control module 303 is further adapted to: clear the stored key information and the corresponding authentication transaction identifier and authentication random number according to the indication in the failure response, control the security service module 301 to obtain the required data again, and then control the application service module 302 to resend an authentication request; or use the reallocated authentication random number to update the stored authentication random number according to the indication in the reset response, and then control the application service module 302 to resend an authentication request.

In the foregoing embodiment, the authentication service device performs centralized allocation and management for the authentication random number. When the UE uses a protected service, the key negotiation process needs to be performed only once, whereupon the authentication is performed with multiple ASs in turn according to the policy of using the authentication random number. Therefore, the process of authentication between the UE and the application is simplified, and the application response speed is improved. Further, the AS may analyze the authentication request of the UE, and choose whether to execute the existing authentication mode or the authentication mode provided herein, thus enhancing the compatibility of the solution under the present invention.

To help understand the foregoing embodiments, application instances of the foregoing embodiments are given below, supposing that: the GAA serves as a basis; the system architecture shown in FIG. 4 is applied; and the AuthS manages the authentication random number in mode (2).

I. GBA Process

Figure 9:
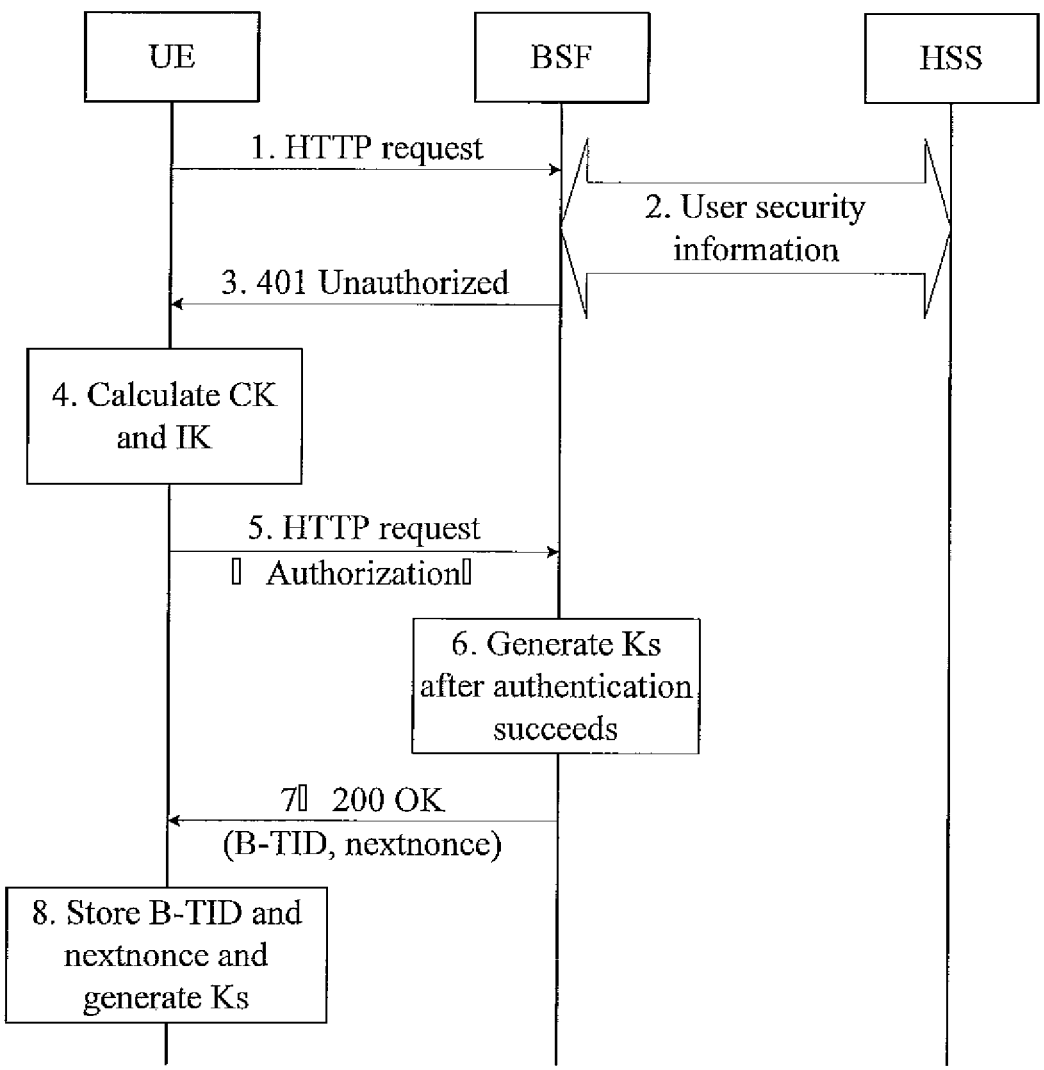
FIG. 9 shows a GBA process in an embodiment of the present invention.

When using a protected service, the UE accesses the BSF first and performs the GBA process which is extended according to the method provided in an embodiment of the present invention, then negotiates the key data shared with the AS. As shown in FIG. 9, the process includes the following steps:

1. The UE sends an HTTP request to the BSF to perform a bootstrapping process. The request message includes the user ID information such as an International Mobile Subscriber Identification Number (IMSI) identifiable to the BSF. The UE generally lets the realm parameter of the Authorization header of the request message carry the Fully Qualified Domain Name (FQDN) of the BSF expected to be accessed.

2. The BSF obtains the security information (such as an Authentication Vector (AV)) of the UE from the Home Subscriber Server (HSS) through a reference point "Zh". The AV includes the data such as CK and IK. The signaling process is detailed in 3GPP TS 29.109.

3. The BSF selects an AV, calculates the authentication data, and sends an HTTP 401 Unauthorized response which carries the authentication data to the UE. The process of constructing a response is detailed in 3GPP TS 24.109.

4. The UE checks the response of the BSF according to the stored data (such as data in the SIM). If the authentication check succeeds, the network is authenticated successfully. The UE calculates out the CK and IK. In this way, both the BSF and the UE own the IK and the CK.

5. The UE calculates out the data in the Authorization header, and resends an HTTP request to the BSF.

6. The BSF authenticates the request message of the UE. After the authentication succeeds, the BSF records the user ID, generates and stores the key data (including B-TID, IMPI, CK, and IK) in this GBA process, and generates key information Ks through the CK and the IK. The process of generating the key data is detailed in 3GPP TS 33.220.

7. The BSF sends a 200 OK response to the UE, indicating authentication success. The response carries the lifespan of the B-TID and the Ks, and a nextnonce parameter added through extension. This parameter carries an authentication random number.

8. The UE receives the response, and stores the parameters such as B-TID and nextnonce after the authentication succeeds, and generates the Ks according to the CK and the IK.

II. Authentication Success Process

Figure 10:
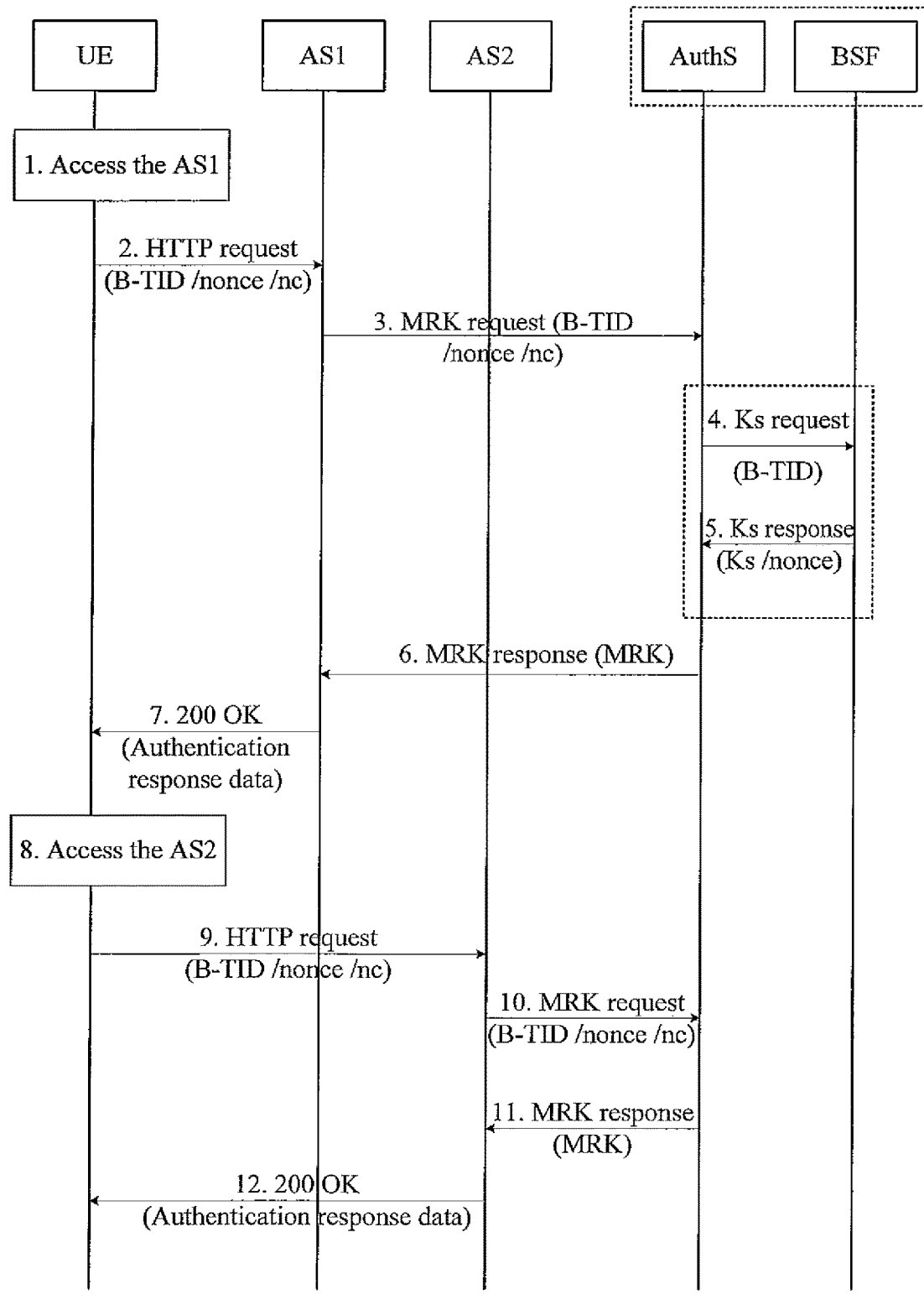
FIG. 10 shows a successful authentication process in an embodiment of the present invention.

It is assumed that the UE accesses two application services (AS1 and AS2) in turn according to the service process, as illustrated in FIG. 10 (because the AuthS and the BSF work together as an authentication service device, FIG. 10 uses dotted lines to indicate the AuthS and the BSF and the relations between them, which also applies hereinafter). The process includes the following steps:

1. The UE accesses the protected service, and the AS1 requires to authenticate the request message. The UE checks for existence of any key data generated in the GBA process. If any such key data exists, the UE calculates the MRK 1 for request authentication. The calculation method is described in 3GPP TS 33.220 Annex B. Instead of using the identifier of the AS1, the NAF_Id may be composed of the FQDN of the BSF and the security protocol identifier of the Ua interface. If no key data exists, the UE needs to execute the foregoing GBA process first.

2. The UE sends an HTTP request carrying an Authorization header to the AS1. The Authorization header defines the parameters required for the AS1 to verify the message, including username, realm, nonce, and nc. The username parameter indicates the B-TID allocated by the BSF in the GBA process; the realm parameter is divided into two parts by a @ symbol, and the last part indicates the domain name of the server which authenticates the message, namely, the FQDN of the BSF; the nonce parameter is the nextnonce parameter value carried in the response returned by the BSF in the GBA process; and the nc parameter indicates the use count of the nextnonce. Other parameters are described in 3GPP TS 24.109.

3. After receiving the request from the UE, the AS1 checks whether the domain name is consistent with the domain name of the AS1 according to the parameters in the Authorization header. If the domain name is consistent, the message authentication process defined in the standard is applied; otherwise, if the domain name is the domain name of the BSF, the authentication process provided herein is applied. Supposing that the domain name is the domain name of the BSF, the AS1 sends a request for the MRK to the AuthS. The request carries the authentication-related parameters such as B-TID, nonce, and nc.

4. After receiving the request message, the AuthS retrieves the data stored in the AuthS according to the B-TID. If the retrieval fails, and if determining that it is the first authentication request of the UE according to nc=1 in the request message, the AuthS sends a request to the BSF to obtain the data such as Ks negotiated in the GBA process.

5. The BSF responds to the query request of the AuthS. The response carries the data such as Ks, Nonce, and data validity period corresponding to the B-TID. The AuthS stores the relevant data entries and initializes "nc=1" in the entries.

6. The AuthS checks whether the nonce and nc in the request message of the AS1 are consistent with the data stored in the AuthS itself. If the check succeeds, the AuthS generates the MRK in the same way as the UE, sends the MRK to the AS1 as a response, and increases the nc value in the entries progressively. If the management mode (1) is applied, the AuthS may further return a nextnonce parameter which carries the nonce for use in the next authentication.

7. After receiving the response from the AuthS, the AS1 generates a response message to the UE, and calculates the authentication response data in the response message according to the MRK.

8. The UE verifies the authentication response data of the AS1. After the verification succeeds, the UE increases the stored nc value progressively, thus indicating that the nonce has been applied once for authenticating the request message. Afterward, depending on the requirement of the service process, the UE accesses the second application service, namely, the AS2.

9. The UE sends an HTTP request carrying an Authorization header to the AS2. This step differs from step 2 in that the nc value is an updated value.

10. With reference to step 3, after receiving the request message of the UE, the AS2 sends a request for the MRK to the AuthS. The request carries the authentication-related parameters such as B-TID, nonce, and nc.

11. After receiving the request, the AuthS retrieves the data stored in the AuthS according to the B-TID. The retrieval succeeds because the data related to the B-TID is already stored. The AuthS verifies whether the nonce and nc in the request are consistent with the stored values. If they are consistent, the AuthS responds to the MRK request of the AS2, and increases the nc value in the entries progressively.

12. With reference to step 7, after receiving the response from the AuthS, the AS2 generates a response message to the UE, and calculates the authentication response data in the response message according to the MRK. The UE verifies the authentication response data of the AS2. After the verification succeeds, the UE increases the stored nc value progressively, thus indicating that the nonce has been applied once more for authenticating the request message.

III. Authentication Failure Process (1)

Figure 11:
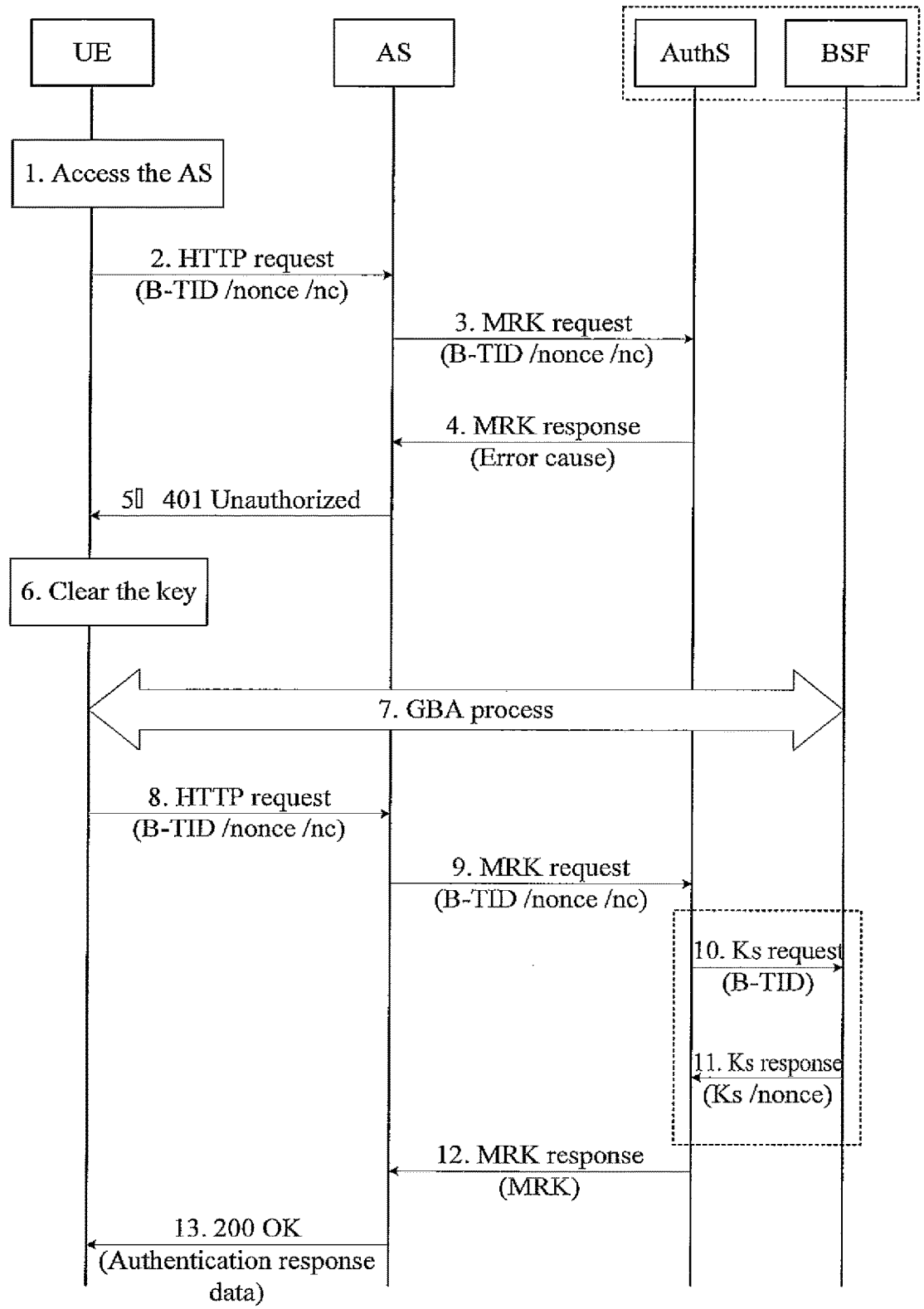
FIG. 11 shows an unsuccessful authentication process in an embodiment of the present invention.

As shown in FIG. 11, the process includes the following steps:

1-3. Steps 1-3 are the same as steps 1-3 in "II. Authentication success process".

4. After receiving the request message, the AuthS retrieves the data stored in the AuthS according to the B-TID. If the retrieval fails and the nc is greater than 1 (nc>1), or if the relevant parameters are not retrievable from the BSF according to the B-TID, or if the retrieval succeeds but the stored nonce and nc are inconsistent with the nonce and nc in the request message, the AuthS returns an error cause to the AS, requires the UE to perform a GBA process again, and re-negotiates the key data shared between the UE and the AS.

5. The AS sends an error response message "401 Unauthorized" to the UE. The message carries a WWW-Authenticate header, and the nonce value in the message is NULL, which instructs the UE to restart the GBA process.

6. The UE receives the response message, and clears the shared key data negotiated in the previous GBA process.

7. The GBA process described in section I above is performed between the UE and the BSF. After completion of the GBA process, the UE reinitializes the data required for authentication. The data is used to resend a request to the AS.

8-13. Steps 8-13 are the same as steps 2-7 in "II. Authentication success process".

IV. Authentication Failure Process (2)

Figure 12:
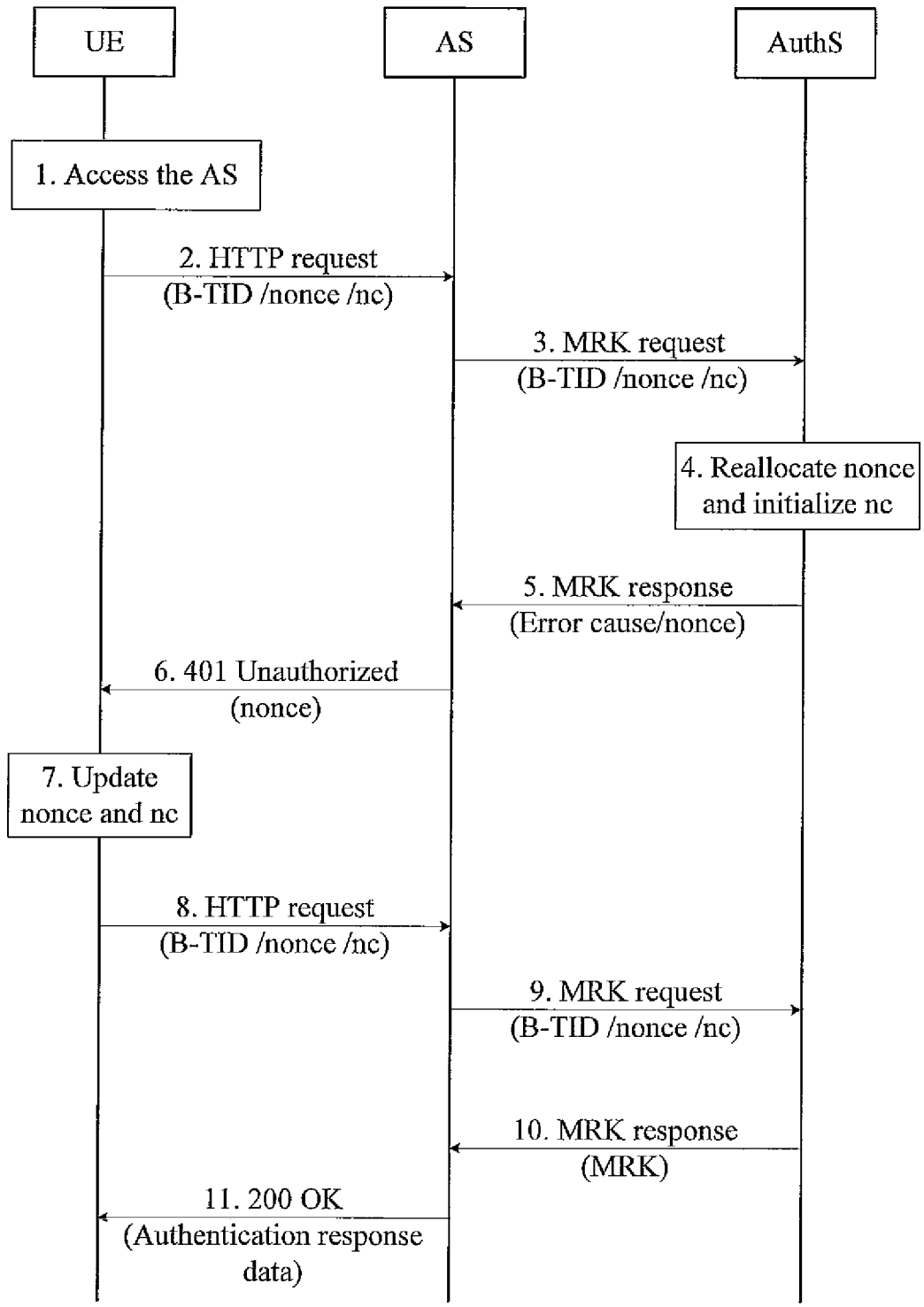
FIG. 12 shows another unsuccessful authentication process in an embodiment of the present invention.

As shown in FIG. 12, the process includes the following steps:

1-3. Steps 1-3 are the same as steps 1-3 in "II. Authentication success process".

4. After the AuthS receives the request message, if the relevant data stored in the AuthS is retrieved unsuccessfully according to the B-TID and the nc is greater than 1, or if the relevant parameters are not retrievable from the BSF according to the B-TID, step 4 in section III described above serves as a reference. If the retrieval succeeds (including success of retrieving the AuthS storage and success of retrieving the BSF), and the Ks corresponding to the B-TID is stored but the stored nonce and nc are inconsistent with the nonce and nc in the request message, the nonce is reallocated and the value of the nc is initialized to 1.

5. The AuthS returns a cause of error and the reallocated nonce to the AS.

6. The AS sends an error response message "401 Unauthorized" to the UE. The message carries a WWW-Authenticate header, and the nonce in the message is the reallocated nonce of the AuthS, which instructs the UE to restart the process of requesting the AS.

7. The UE receives the response message, and updates the nonce and nc.

8-11. Steps 8-11 are the same as steps 9-12 in "II. Authentication success process".

It is understandable to those skilled in the art that all or part of the steps in the foregoing embodiments may be performed through hardware instructed by a program. The program may be stored in a computer-readable storage medium such as a Read-Only Memory/Random Access Memory (ROM/RAM), a magnetic disk, and a compact disk.

Detailed above are a method for an authentication service device to authenticate request messages, a method for an AS to authenticate requests of a UE, a UE authentication method, and the corresponding authentication service device, AS, and UE. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for authenticating request messages, the method comprising:

negotiating key information between an authentication service device and a User Equipment (UE);

generating and storing, at the authentication service device, an authentication transaction identifier and an authentication random number corresponding to the negotiated key information;

allocating the generated authentication transaction identifier and the authentication random number to the UE;

receiving, at the authentication service device, an association request from an Application Server (AS), wherein the association request carries the authentication transaction identifier and the authentication random number;

verifying the authentication random number carried in the association request according to the authentication transaction identifier carried in the association request, said verifying comprises:

(i) when the authentication service device is in an Update Management Mode, searching for the authentication random number corresponding to the authentication transaction identifier carried in the association request; verifying whether the authentication random number carried in the association request is consistent with the found authentication random number; after the verification succeeds, allocating a new authentication random number to update the found authentication random number; and (ii) when the authentication service device is in a Use Count Management Mode, searching for the authentication random number corresponding to the authentication transaction identifier carried in the association request and its use count; and verifying whether the authentication random number carried in the association request and its use count are consistent with the found authentication random number and its use count;

in response to successful verification, searching within the authentication service device for the negotiated key information corresponding to the verified authentication transaction identifier carried in the association request, and returning an association response to the AS in response to the association request, wherein the association response carries an authentication key generated according to the found negotiated key information and one of the new authentication random number which instructs the UE to use the new authentication random number to send an authentication request to a next AS, and a use count of the authentication random number which instructs the UE to use the use count in the authentication request sent to the AS and further in the association request of the AS to the authentication service device.

2. The method of claim 1, further comprising: returning an association failure response to the AS in response to the association request after the verification fails, wherein the association failure response carries an indication which indicates verification failure and instructs the UE to perform key negotiation again.

3. The method of claim 1, further comprising:
checking for existence of any key information corresponding to the authentication transaction identifier carried in the association request after the verification fails;
if such key information exists, reallocating an authentication random number as the authentication random number corresponding to the authentication transaction identifier carried in the association request, and returning an association reset response to the AS in response to the association request, wherein the association reset response carries the reallocated authentication random number which instructs the UE to use the reallocated authentication random number to resend the authentication request to the AS; or if no such key information exists, returning an association failure response to the AS in response to the association request, wherein the association failure response carries an indication which indicates verification failure and instructs the UE to perform key negotiation again.

4. An authentication service device, comprising:
an authentication service module, configured to:
negotiate key information with a User Equipment (UE), generate and store an authentication transaction identifier and an authentication random number corresponding to the negotiated key information, and
allocate the generated authentication transaction identifier and the authentication random number to the UE; and
a uniform authentication module, configured to:
receive an association request from an Application Server (AS),
obtain the authentication transaction identifier and the authentication random number carried in the association request,
verify the authentication random number carried in the association request according to the authentication transaction identifier carried in the association request, and
(i) when the authentication service device is in an Update Management Mode, search for the authentication random number corresponding to the authentication transaction identifier carried in the association request; verify whether the authentication random number carried in the association request is consistent with the found authentication random number; after the verification succeeds, allocate a new authentication random number to update the found authentication random number; and (ii) when the authentication service device is in a Use Count Management Mode, search for the authentication random number corresponding to the authentication transaction identifier carried in the association request and its use count; and verify whether the authentication random number carried in the association request and its use count are consistent with the found authentication random number and its use count;
search for the negotiated key information corresponding to the verified authentication transaction identifier carried in the association request after the verification succeeds, and
return an association response to the AS in response to the association request, wherein the association response carries an authentication key generated according to the found negotiated key information and one of the new authentication random number which instructs the UE to use the new authentication random number to send an authentication request to a next AS, and a use count of the authentication random number which instructs the UE to use the use count in the authentication request sent to the AS and further in the association request of the AS to the authentication service device.

5. The authentication service device of claim 4, wherein the uniform authentication module is further configured:
return an association failure response to the AS in response to the association request after the verification fails, wherein the association failure response carries an indication which indicates verification failure and instructs the UE to perform key negotiation again; or
check for existence of any key information corresponding to the authentication transaction identifier carried in the association request after the verification fails; if such key information exists, reallocate an authentication random number to update the stored authentication random number corresponding to the authentication transaction identifier carried in the association request, and return an association reset response to the AS in response to the association request, wherein the association reset response carries the reallocated authentication random number which instructs the UE to use the reallocated authentication random number to resend the authentication request to the AS; or, if no such key information exists, return an association failure response to the AS in response to the association request.

6. A system comprising an authentication service device, a user equipment (UE), and an application server (AS), wherein:
the authentication service device comprises:
an authentication service module, configured to:
negotiate key information with the UE, generate and store an authentication transaction identifier and an authentication random number corresponding to the negotiated key information, and
allocate the generated authentication transaction identifier and the authentication random number to the UE; and
a uniform authentication module, configured to:
receive an association request from the AS,
obtain the authentication transaction identifier and the authentication random number carried in the association request,
verify the authentication random number carried in the association request according to the authentication transaction identifier carried in the association request, and (i) when the authentication service device is in an Update Management Mode, search for the authentication random number corresponding to the authentication transaction identifier carried in the association request; verify whether the authentication random number carried in the association request is consistent with the found authentication random number; after the verification succeeds, allocate a new authentication random number to update the found authentication random number; and (ii) when the authentication service device is in a Use Count Management Mode, search for the authentication random number corresponding to the authentication transaction identifier carried in the association request and its use count; and verify whether the authentication random number carried in the association request and its use count are consistent with the found authentication random number and its use count;

search for the negotiated key information corresponding to the verified authentication transaction identifier carried in the association request after the verification succeeds, and return an association response to the AS in response to the association request, wherein the association response carries an authentication key generated according to the found negotiated key information and one of the new authentication random number which instructs the UE to use the new authentication random number to send an authentication request to a next AS, and a use count of the authentication random number which instructs the UE to use the use count in the authentication request sent to the AS and further in the association request of the AS to the authentication service device.

7. The system of claim 6, wherein the AS comprises:
an interface module, configured adapted to:
  receive an authentication request from a User Equipment (UE),
  send an association request to an authentication service device,
  receive an association response from the authentication service device in response to the association request; and return a success response to the UE in response to the authentication request; and
a security association module, configured to:
  obtain an authentication transaction identifier and an authentication random number carried in the authentication request,
  generate the association request according to the authentication request, wherein the association request carries the authentication transaction identifier and the authentication random number,
  obtain an authentication key carried in the association response,
  generate authentication response data according to the authentication key carried in the association response, and
  generate the success response, wherein the success response carries the authentication response data.

8. The system of claim 7, wherein the security association module is further configured to:
  obtain a domain name of a server which authenticates the authentication request, wherein the domain name is carried in the authentication request,
  check that the domain name of the server is the domain name of the authentication service device, and then generate the association request.

9. The system of claim 7, wherein:
the interface module is further configured to:
  receive an association failure response or an association reset response returned by the authentication service device in response to the association request, and
  return a failure response or a reset response to the UE in response to the authentication request; and
the security association module is further configured to:
  generate the failure response according to the association failure response, wherein the failure response carries an indication which instructs the UE to perform key negotiation again,
  obtain a reallocated authentication random number carried in the association reset response, and
  generate the reset response according to the association reset response, wherein the reset response carries the reallocated authentication random number for instructing the UE to use the reallocated authentication random number to resend the authentication request.

10. The system of claim 6, wherein the UE comprises:
a security service module, configured to:
  negotiate key information with an authentication service device, and
  obtain an authentication transaction identifier and an authentication random number from the authentication service device and which correspond to the negotiated key information;
an application service module, configured to:
  send an authentication request to an Application Server (AS), wherein the authentication request carries the authentication transaction identifier and the authentication random number,
  obtain a success response from the AS in response to the authentication request, the success response generated in response to the AS sending an association request to the authentication service device, wherein the association request carries the authentication transaction identifier and the authentication random number,
  obtain authentication response data carried in the success response, and
  verify the authentication response data according to the key information; and
an authentication control module, configured to:
  judge whether the negotiated key information and the authentication transaction identifier and the authentication random number corresponding to the negotiated key information are stored when an authentication request needs to be sent to the AS; if no such information is stored, control the security service module to obtain required data; and, if such information is stored, control the application service module to send the authentication request.

11. The system of claim 10, wherein:
the application service module is further configured to obtain a new authentication random number from the success response; and
the authentication control module is further configured to use the new authentication random number to update the stored authentication random number.

12. The system of claim 10, wherein:
the application service module is further configured to add a use count of the authentication random number into the authentication request; and the authentication control module is further configured to increase the use count of the stored authentication random number progressively after receiving the success response.

13. The system of claim 10, wherein:

the application service module is further configured to obtain a failure response returned by the AS in response to the authentication request, wherein the failure response carries an indication which instructs the UE to perform key negotiation again; and the authentication control module is further configured to:
 clear the stored key information and the corresponding authentication transaction identifier and authentication random number according to the indication in the failure response,
 control the security service module to obtain the required data again, and
 then control the application service module to resend the authentication request.

14. The system of claim 10, wherein:

the application service module is further configured to:
 obtain a reset response returned by the AS in response to the authentication request, and
 obtain a reallocated authentication random number carried in the reset response; and the authentication control module is further configured to:
 use the reallocated authentication random number to update the stored authentication random number, and
 then control the application service module to resend the authentication request.

* * * * *